US008571055B2

(12) United States Patent
Forssell

(10) Patent No.: US 8,571,055 B2
(45) Date of Patent: *Oct. 29, 2013

(54) SENDING PERMISSION ASSIGNMENT IN TELECOMMUNICATIONS SYSTEM

(75) Inventor: Mika Forssell, Espoo (FI)

(73) Assignee: Nokia Corporation, Espoo (FI)

( * ) Notice: Subject to any disclaimer, the term of this patent is extended or adjusted under 35 U.S.C. 154(b) by 1242 days.

This patent is subject to a terminal disclaimer.

(21) Appl. No.: 11/987,193

(22) Filed: Nov. 28, 2007

(65) Prior Publication Data

US 2008/0165744 A1    Jul. 10, 2008

Related U.S. Application Data

(63) Continuation of application No. 10/350,002, filed on Jan. 24, 2003, now Pat. No. 7,333,503, which is a continuation of application No. PCT/FI01/00681, filed on Jul. 23, 2001.

(30) Foreign Application Priority Data

Jul. 24, 2000    (FI) ...................................... 20001705

(51) Int. Cl.
*H04J 4/00*    (2006.01)

(52) U.S. Cl.
USPC ............................ 370/436; 370/441; 370/468

(58) Field of Classification Search
USPC .......... 370/229–235, 329–349, 341–445, 468
See application file for complete search history.

(56) References Cited

U.S. PATENT DOCUMENTS

| | | | |
|---|---|---|---|
| 5,537,414 A | | 7/1996 | Takiyasu et al. |
| 5,598,417 A | * | 1/1997 | Crisler et al. ................. 370/348 |
| 5,745,695 A | | 4/1998 | Gilchrist et al. |
| 5,751,708 A | * | 5/1998 | Eng et al. ................. 370/395.42 |
| 5,752,193 A | * | 5/1998 | Scholefield et al. ....... 455/452.2 |

(Continued)

FOREIGN PATENT DOCUMENTS

| | | |
|---|---|---|
| EP | 0 984 641 A3 | 3/2000 |
| EP | 1 006 695 A1 | 6/2000 |

(Continued)

OTHER PUBLICATIONS

"Digital Cellular Telecommunications System (Phase 2+); General Packet Radio Service (GPRS); Service Description; Stage 2", (GSM 03.60 version 7.1.1 Release 1998). ETSI EN 301 344 V7.1.1. pp. 78-83.

(Continued)

*Primary Examiner* — Phuc Tran
(74) *Attorney, Agent, or Firm* — Alston & Bird LLP

(57) ABSTRACT

A method for assigning sending permissions in a telecommunications system and a telecommunications system comprising a unit (20) providing access to said system for at least one telecommunication terminal (40) and a control unit (11) for scheduling data transfer between said at least one telecommunication terminal and the telecommunications system, whereby the control unit (11) is located apart from the access providing unit (20) and whereby said data transfer takes place on at least one transmission channel and more than one telecommunication terminal is arranged to use the same transmission channel so that a telecommunication terminal is allowed to send on the transmission channel when a sending permission is assigned to said telecommunication terminal, whereby the access providing unit (20) is arranged to assign a sending permission to the telecommunication terminal.

48 Claims, 1 Drawing Sheet

(56) References Cited

U.S. PATENT DOCUMENTS

| | | | |
|---|---|---|---|
| 5,978,368 | A | 11/1999 | Hjelm et al. |
| 6,072,784 | A | 6/2000 | Agarwal et al. |
| 6,097,958 | A | 8/2000 | Bergen |
| 6,205,157 | B1 | 3/2001 | Galyas et al. |
| 6,295,285 | B1 * | 9/2001 | Whitehead .................... 370/329 |
| 6,327,254 | B1 | 12/2001 | Chuah |
| 6,374,112 | B1 | 4/2002 | Widegren et al. |
| 6,452,915 | B1 | 9/2002 | Jorgensen |
| 6,870,824 | B1 * | 3/2005 | Kim et al. .................... 370/342 |
| 6,898,194 | B1 | 5/2005 | Vedrine |
| 6,954,470 | B2 | 10/2005 | Paneth et al. |
| 6,963,544 | B1 | 11/2005 | Balachandran et al. |
| 7,054,285 | B2 | 5/2006 | Molno et al. |
| 7,181,223 | B1 | 2/2007 | Pecen et al. |
| 7,333,503 | B2 * | 2/2008 | Forssell ........................ 370/436 |

FOREIGN PATENT DOCUMENTS

| | | |
|---|---|---|
| WO | WO 98/57509 | 12/1998 |
| WO | WO 99/41918 | 8/1999 |
| WO | WO 01/20930 A1 | 3/2001 |

OTHER PUBLICATIONS

The GSM System for Mobile Communications by M. Mouly, M-B Pautet, France 1992, ISBN 2-9507190-07.

International Search Report for Application No. PCT/FI01/00681 mailed Oct. 19, 2001.

Office Action for Chinese Application No. 200810182195.0 mailed Mar. 12, 2010.

Salkintzis, Apostolis K.; "A Survey of Mobile Data Networks"; IEEE Communications Surveys; Third Quarter 1999, vol. 2, No. 3; pp. 2-18.

* cited by examiner

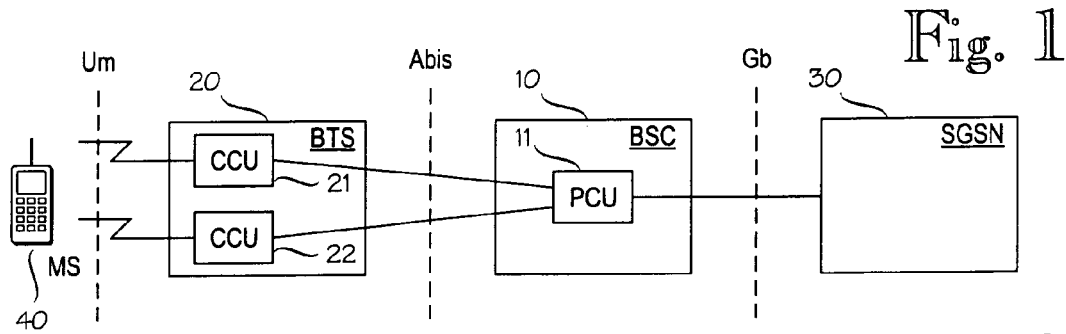
Fig. 1
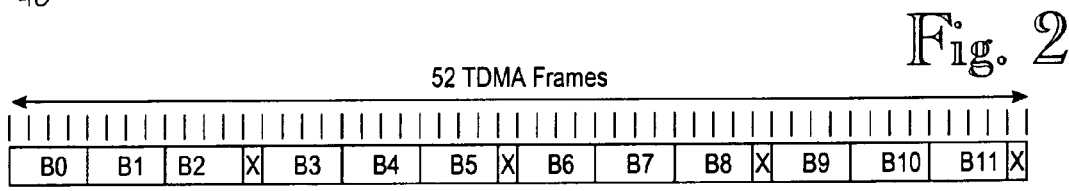
Fig. 2
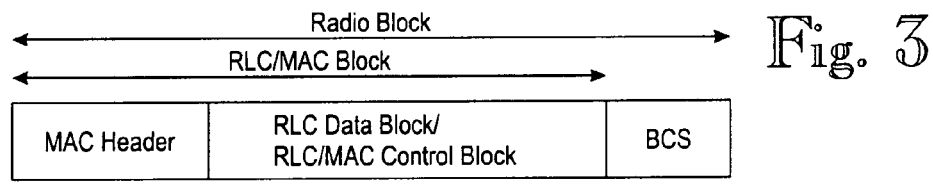
Fig. 3
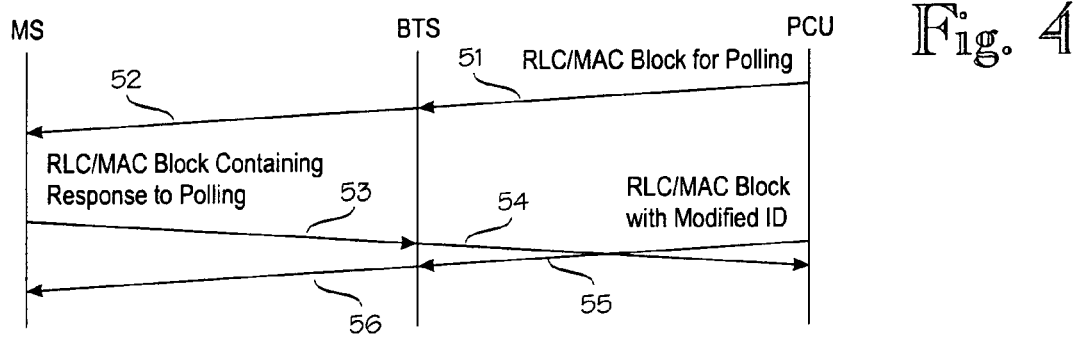
Fig. 4
Fig. 5A
| BP1 | BP2 | BP3 | BP4 | BP5 | BP6 | BP7 | BP8 | BP9 | BP10 | BP11 | BP12 |
|---|---|---|---|---|---|---|---|---|---|---|---|
| MS1 | MS2 | MS3 | MS1 | MS2 | MS3 | MS1 | MS2 | MS3 | MS1 | MS1 | MS1 |
Fig. 5B
| BP1 | BP2 | BP3 | BP4 | BP5 | BP6 | BP7 | BP8 | BP9 | BP10 | BP11 | BP12 |
|---|---|---|---|---|---|---|---|---|---|---|---|
| MS1 | MS2 | MS3 | MS1 | MS2 | MS3 | MS1 | MS2 | MS3 | MS1 | MS1 | MS1 |
Fig. 5C
| BP1 | BP2 | BP3 | BP4 | BP5 | BP6 | BP7 | BP8 | BP9 | BP10 | BP11 | BP12 |
|---|---|---|---|---|---|---|---|---|---|---|---|
| MS1 | MS1 | MS1 | MS1 | MS1 | MS1 | MS1 | MS1 | MS1 | MS1 | MS1 | MS1 |

SENDING PERMISSION ASSIGNMENT IN TELECOMMUNICATIONS SYSTEM

This application is a Continuation of U.S. patent application Ser. No. 10/350,002, filed Jan. 24, 2003, now U.S. Pat. No. 7,333,503 which is a Continuation Application of International Application PCT/FI01/00681 filed on Jul. 23, 2001, the entire disclosures of which are incorporated herein by reference.

BACKGROUND OF THE INVENTION

The invention relates to assigning sending permissions in a telecommunications system.

The general packet radio service GPRS is a new service in the GSM system. The GPRS subnetwork includes a number of packet data service nodes SN, which will be called serving GPRS support nodes SGSN in this application. Each SGSN is connected to a GSM mobile communication network (typically to a base station controller BSC or to a base station BTS in the base station system) to allow the SGSN to provide packet service for mobile data terminals via several base stations, i.e. cells. The intermediate mobile communication network provides a radio interface and packet-switched data transmission between the SGSN and the telecommunication terminal i.e. mobile stations (MS). Different subnetworks are connected to an external data network, e.g. to a public switched data network PSPDN, via GPRS gateway support nodes GGSN. Thus the GPRS service enables packet data transmission between mobile stations and external data networks as the GSM network functions as a radio access network RAN.

In the GPRS network data packets arriving from several users are sent using the same radio channel. Therefore, the unit responsible for timing, i.e. the packet control unit (PCU), has to be able to decide in which radio frame each data packet is sent. The PCU assigns sending permissions for mobile stations sharing a radio timeslot (TS), i.e. tells which mobile station may transmit and when. The packet control unit may be separate from the actual unit providing the radio interface. According to GPRS specifications, PCU may be located at a base station (BTS), a base station controller (BSC) or an SGSN site.

A GPRS block period (BP) is a sequence of four time slots on a PDCH (Packet Data Channel) used to convey one radio block. A radio block is a sequence of four normal bursts carrying one RLC/MAC (Radio Link Control/Medium Access Control) protocol data unit, i.e. a RLC/MAC block which is a data unit exchanged between RLC/MAC entities. The block period is approximately 20 ms corresponding to the period that the transmission of one RLC/MAC block over the Abis interface lasts.

In case dynamic allocation is used for uplink transmission, the PCU assigns a mobile station uplink sending permission by including USF (Uplink State Flag) allocated for the mobile station in downlink RLC/MAC block's MAC header. Mobile stations observe the time slots allocated to their uplink transmission and in case a mobile station recognizes its own USF in downlink RLC/MAC block's MAC header, the mobile station may transmit in the uplink direction on the next block period.

In case fixed allocation is used for uplink transmission, the PCU assigns a mobile station uplink sending permissions in an assignment bitmap. The mobile station does not have to monitor downlink RLC/MAC blocks to find out whether the mobile station may transmit or not. Based on the assigned bitmap the mobile station knows in advance when the mobile station may transmit.

The PCU may also poll a mobile station using a RRBP (Relatively Reserved Block Period) field in the MAC header. For example, in case of downlink transmission, the PCU may include a valid RRBP field in a downlink RLC/MAC data block which causes one uplink block period reservation for the mobile station. In the allocated block period the mobile station shall send a Packet Downlink Ack/Nack message to the PCU and acknowledge received blocks. In the Downlink Ack/Nack message the mobile station may also indicate if it has data to be sent.

In case a mobile station is transferring real-time (RT) traffic, the mobile station needs more sending permissions than a mobile station transferring non-real-time (NRT) traffic in order to meet delay and throughput requirements. An RT mobile station should be able to start transmitting data quite soon (within 40 to 60 ms, for example) after having data at the RLC/MAC layer (e.g. when a user starts to talk).

An RT mobile station having a silent period (i.e. having temporarily no data to transmit e.g. because the user is not talking) is polled in order to learn if the mobile station has data to be transmitted. When the PCU is located apart from a BTS site (in a BSC, for example), the time between sending the polling command and receiving a response from the MS is several block periods (BPs). The delay can be around 8 BPs (160 ms) which consists of the following components: PCU to BTS transmission takes 3 BPs (approximate value, due to e.g. delay caused by buffering inside the BTS), BTS to MS transmission takes 1 BP, MS to BTS transmission takes 1 BP, BTS to PCU transmission takes 3 BPs. Thus the PCU learns only about 8 BPs after polling the mobile station if the mobile station has more data to transmit.

The PCU has currently two ways to schedule (assign a sending permission) a mobile station if the PCU is located apart from a BTS site:

1) The PCU could poll the mobile station every now and then and start assigning sending permissions to the mobile station only after learning the mobile station has more data to transmit. It would take around 12 BPs (8+4) before the mobile station would be able to transmit data at normal phase.

2) The PCU could assign a sending permission to the mobile station e.g. every second BP. When the PCU learns the mobile station has more data to transmit, the PCU starts assigning sending permissions to the mobile station more frequently (e.g. at every BP). Before the mobile station receives sending permissions frequently enough, the mobile station may use the already sent polling permissions to start sending data.

The alternative 1 is probably much too slow and thus would give unacceptable transmission delay for an RT mobile station. The alternative 2 may give acceptable service for the RT mobile station in case the PCU polls the mobile station frequently enough. However, the polling sending permissions the RT mobile station uses to start its transmission may not be enough to satisfy the delay and throughput characteristics. Furthermore, sending permissions are wasted if the mobile station is polled frequently and it has nothing to send.

BRIEF DESCRIPTION OF THE INVENTION

The object of the invention is to provide a method and an apparatus implementing the method to eliminate the above-mentioned problems. The object of the invention is achieved by a method and an arrangement which are characterized by what is disclosed in the independent claims 1, 21 and 37. The preferred embodiments of the invention are disclosed in the dependent claims.

The invention is based on the idea that a unit (e.g. a base station) providing access to a telecommunications system for telecommunication terminals (e.g. a mobile station) participates in an uplink sending permission assignment procedure when a control unit (e.g. a packet control unit) that schedules data transfer between the telecommunication terminal and the telecommunications system is not located at said access providing unit.

An advantage of the method and arrangement of the invention is that it enables enough sending permissions to be assigned for a telecommunication terminal, when the telecommunication terminal has more data to be transmitted after a silent period, and thus enables the more efficient use of resources. The invention is especially advantageous when transmitting real time traffic.

BRIEF DESCRIPTION OF THE DRAWINGS

The invention will be described in greater detail by means of preferred embodiments with reference to the accompanying drawings, in which FIG. 1 is a block diagram of a data transmission system according to a preferred embodiment of the invention, FIG. 2 illustrates a multi-frame structure of a PDCH channel of the GPRS system, FIG. 3 illustrates structures of an RLC/MAC block and a radio block, FIG. 4 illustrates a message sequence diagram according to an embodiment of the invention, FIG. 5A illustrates sending permissions assigned by the PCU, FIG. 5B illustrates sending permissions assigned by the PCU and FIG. 5C illustrates sending permissions after the modification by the BTS according to an embodiment of the invention.

DETAILED DESCRIPTION OF THE INVENTION

The present invention is applicable to different telecommunications systems, e.g. to the GSM system together with the general packet radio service (GPRS). In the following, the preferred embodiments of the invention are described by means of the GPRS/GSM radio system without limiting the invention to this particular radio system. The invention is not limited to systems utilizing a radio path either.

FIG. 1 illustrates, in respect of the parts relevant to understanding the invention, the basic architecture of the GSM system and the architecture of a GPRS packet radio network implemented in the GSM system. The basic structure of the GSM network consists of two parts: a base station system (BSS) and a network subsystem (NSS). The BSS and mobile stations (MS) 40 communicate via radio connections over a radio interface Um. In the base station system BSS each cell is served by a base transceiver station (BTS) 20. The base station 20 is connected to a base station controller (BSC) 10, which controls the radio frequencies and channels used by the base station. The base station controller 10 is further connected to a mobile switching centre (MSC, not shown). As regards a more detailed description of the GSM system, reference is made to the ETSI/GSM recommendations and to *The GSM System for Mobile Communications*, M. Mouly and M-B. Pautet, Palaiseau, France, 1992, ISBN: 2-9507190-07-7.

FIG. 1 also illustrates a support node 30 of the GPRS system, which is connected to the GSM system. The serving GPRS support node 30 is a node which serves the mobile station 40. Each support node SGSN manages the packet data service in the area of one or more cells in a cellular packet radio network. For this purpose, each support node SGSN is connected (Gb interface) to a certain local part of the GSM mobile communication system. This connection is typically made to the base station system BSS, i.e. to the base station controller BSC (as in FIG. 1) or to one of the base stations BTS. The mobile station 40, which is in the cell, communicates with the base station 20 over the radio interface Um and further through the mobile communication network with the support node 30 to the service area of which the cell belongs. In principle, the mobile communication network between the support node 30 and the mobile station 40 only transmits packets between these two. The mobile communication network provides a physical connection for transmission of data packets between the mobile station 40 and the serving support node 30. Additional information on the GPRS and the protocols used therein can be obtained, if needed, from ETSI (European Telecommunications Standards Institute) GPRS specifications.

The base station system and the serving support node are connected by a Gb interface which enables exchange of signalling information and data. To be more precise, the Gb interface is located between a packet control unit (PCU) 11 and the SGSN 30. The packet control unit is a functional unit which is responsible for different functions in the GPRS MAC (Medium Access Control) and RLC (Radio Link Control) layers. These functions include establishment of RLC/MAC blocks for downlink transmission (towards the mobile station), de-assembly of blocks for uplink transmission (towards the network), timing of PDCH (Packet Data Channel), channel access control functions (access request and access grants) and management functions of the radio channel, such as power control, allocation and release of radio channels and broadcast of control information, for example. FIG. 3 illustrates the structure of an RLC/MAC block which consists of two parts which are the MAC header and an RLC data block or an RLC/MAC control block. All downlink RLC/MAC blocks comprise an USF (Uplink State Flag) field in the MAC header which indicates the owner or use of the next uplink radio block on the same time slot.

The packet control unit is connected to a channel codec unit (CCU) 21 and 22 by means of an Abis interface. The functions of the channel codec unit include channel coding functions (including codirectional error correction FEC and interleaving) and measuring functions related to the radio channel. The channel codec unit also establishes GPRS radio blocks, i.e. GPRS packets in which the data and signalling information, i.e. RLC/MAC protocol data units, are sent over the radio interface Um. The channel codec unit 21 and 22 is always located in the base station 20, but the PCU has a variety of alternative locations: base station BTS, base station controller BSC (as in FIG. 1) or support node SGSN. When the PCU is separate from the BTS, the CCU (or some similar unit within the BTS) may control some of the PCU functions.

When the packet control unit 11 is separate from the base station 20, data is transmitted between the packet control unit 11 and the channel codec unit 21 or 22 over the Abis interface using PCU-TRAU frames which are extensions of the TRAU (Transcoder/Rate Adaptor Unit) frames. Both GPRS data signals and GPRS MAC/RLC control signals on a PDTCH (Packet Data Traffic Channel) are transmitted in the PCU-TRAU frames.

Over the air interface Um traffic is transmitted in blocks which are provided by the physical layer of the OSI model. The duration of each physical block (radio block) is four GSM bursts, which are sent in sequence on one physical channel (time slot). FIG. 2 illustrates the multi-frame structure of a PDCH channel which comprises 52 TDMA frames. Each of the radio blocks B0 to B11 is divided into four TDMA frames. There is also one idle frame (denoted by X in the figure) at the intervals of three radio blocks. FIG. 3 illustrates the structure of a radio block. Each radio block B0 to B11 consists of three parts which are the MAC header, RLC data block or RLC/MAC control block and check block BCS (Block Check Sequence).

The invention proposes that the BTS participates in the uplink sending permission assignment procedure when the PCU is not located at the BTS site. In the following a preferred embodiment of the invention is described with reference to FIG. 4 illustrating a message sequence diagram according to an embodiment of the invention. The PCU polls the MS every Nth BP (e.g. every second or third BP). Polling can be done e.g. by assigning the MS an uplink sending permission by e.g. including an USF (Uplink State Flag) allocated for the mobile station in a downlink RLC/MAC block's MAC header whereupon the MS may transmit in the uplink direction on the next block period as described earlier and response to the polling. Polling can also be done e.g. by using a Packet Polling Request message with an RRBP field in the MAC header. When an MS is being polled, the PCU preferably notifies the BTS about it. The notification is given e.g. as part of PCU-TRAU frame control information in which the RLC/MAC block containing the polling command is transferred (51) from the PCU to the BTS. When the BTS receives such a polling command, it saves some parameters associated with the PCU-TRAU frame containing the RLC/MAC block in which the MS is being polled and forwards (52) the RLC/MAC block to the MS. Such saved parameters are e.g. the id of the MS to be polled (e.g. the USF in the MAC header), preferably the Tx power level the BTS will use when sending the RLC/MAC block in the air and optionally the description of other time slots the MS is using. The MS id may be given separately along with the polling command or the BTS may decode the id from the received RLC/MAC block (e.g. the USF from the MAC header of the RLC/MAC block). When the BTS receives a response (53) from the MS, the BTS observes if the received frame indicates the MS has data to be transmitted. Such an indication may be e.g. an RLC/MAC data block instead of e.g. a Packet Uplink Dummy Control Block in which case the Packet Uplink Dummy Control Block would indicate that the MS has no data to be transmitted at the moment. The response containing RLC/MAC block is forwarded (54) to the PCU.

In case the MS indicates that it has no data to be transmitted at the moment, the BTS continues with the normal operation.

In case the MS indicates it has more data to be transmitted, the BTS operates in the following way:

When the BTS receives (55) subsequent PCU-TRAU frames for the radio timeslot (and optionally for other time slots the MS is using) from the PCU, the BTS replaces the MS id (e.g. the USF) in the RLC/MAC block which assigns a sending permission to the MS and forwards (56) this modified RLC/MAC block to the MS. Thus the MS is given sending permissions immediately.

The BTS preferably uses the Tx power level and other important parameters received along with the original polling command. In case the BTS receives subsequent PCU-TRAU frames containing an RLC/MAC block or a sending permission for the MS, the BTS preferably replaces the Tx power level and other important parameters with the parameters received in the most recent PCU-TRAU frame.

The BTS preferably considers parameters saved for the MS and received with a new PCU-TRAU frame when sending the RLC/MAC block in the air. It may happen that in a PCU-TRAU frame the PCU assigns a sending permission for the MS, but RLC contents of the RLC/MAC block are destined to some other MS and thus e.g. the Tx power level suitable for both MSs must be considered when sending the RLC/MAC block in the air.

In case the BTS has replaced the sending permission with MS's id and the MS indicates that it has no more data to transmit at the moment, the BTS stops, according to a preferred embodiment of the invention, replacing the id of the MS into RLC/MAC blocks and may remove information associated with the MS. The BTS continues with the normal operation, i.e. sends RLC/MAC blocks received from the PCU in the air without modifying sending permissions.

In case the BTS is to assign sending permissions to the MS but the PCU sends an idle PCU-TRAU frame in the downlink direction which does not contain a valid RLC/MAC block, the BTS will preferably either generate a RLC/MAC block (e.g. a Packet Downlink Dummy Control Block) in which the BTS sets an MS id or the BTS will omit the sending permission.

Alternatively, in case the fixed allocation is used for the uplink transmission, the BTS may assign the MS uplink sending permissions in an assignment bitmap by forming an Assignment message in which a certain amount of sending permissions are allocated to the MS and sending this message to the MS. The MS can continue its uplink sending according to the assignment bitmap sent by the BTS. The MS using such fixed allocation can be polled by using e.g. a Packet Polling Request message or the PCU can provide the MS when the data transmission stops temporarily with an assignment bitmap allowing the MS to send every now and then.

According to a preferred embodiment of the invention the PCU may use a new bit called RI (Replace Indication), for instance, in the PCU-TRAU frame that is sent to the BTS. When the RI bit is set to '1', the BTS may replace information that assigns a sending permission to a MS (e.g. a USF) in the next RLC/MAC block that is sent in the downlink direction, in case the MS has indicated it has data to be transmitted, even if the original RLC/MAC block received from the PCU assigns a sending permission to some other MS. In case the RI bit is set to '0', the BTS may not replace the MS id assigning a sending permission in the RLC/MAC block.

In order to avoid double reservations for the same BP owing to the BTS being able to replace a sending permission assignment made by the PCU, the following mechanisms may be used according to preferred embodiments of the invention:

The RI field in the above described PCU-TRAU frame is used. When the PCU allocates a sending permission to e.g. an MS making two phase access or when the PCU e.g. polls an MS with an RRBP field in an RLC/MAC block or in any similar situation when the sending permission allocated by the PCU should not be changed by the BTS, the PCU sets the RI field to '0' in the PCU-TRAU frame being sent to the BTS that corresponds to the assigned sending permission. Also when fixed allocation is used, the PCU sets the RI bit to '0' when an MS using fixed allocation is about to transmit. That way the BTS may not replace the sending permission with MS's id and the MS to which the sending permission was originally assigned may transmit without disturbance.

Alternatively, the BTS can keep a record of sending permissions reserved in advance. For example, when an MS makes a two-phase access, the PCU assigns the MS one sending permission (one BP) on one time slot in which the MS sends a Packet Resource Request message to the network. The sending permission is usually assigned over half a second ahead in time when the PCU handles the two-phase access request. The sending permission is assigned to an MS in an Assignment message that is sent from the PCU to the BTS and from the BTS to the MS. When the BTS receives such an Assignment message, the BTS should keep a record of the assigned sending permission in order not to replace the assigned sending permission if the MS has data to be transmitted. Also when the PCU polls an MS with an RRBP field in an RLC/MAC block, the BTS should keep a record of those pollings in order not to assign the same BP for two different MSs. In case fixed assignment is used, the BTS should keep track of the allocated BPs, which means that either the BTS decodes the assignment messages sent to the MS or the PCU tells the BTS of the assigned sending permissions.

The usage of the RI field in the PCU-TRAU frame is advantageous because then the BTS does not have to keep record of pre-assigned sending permissions (e.g. as part of a two-phase access procedure or an RRBP polling procedure). Thus the operation of the BTS is simpler.

An example of the operation of the invention is given below. Sending permissions on one time slot (channel) are described. The following example also enlightens one embodiment of the invention. Provided that the BTS is allowed to assign sending permissions (e.g. the value of the RI bit is '0') and the response to polling indicates that the MS has data to be sent, BTS may replace sending permissions of other MSs with a sending permission of the MS.

FIGS. 5A, 5B and 5C illustrate sending permissions assigned to three mobile stations MS1, MS2 and MS3 for block periods BP1-BP12. The mobile station (MS1, MS2 or MS3) to which a sending permission for a block period is assigned is indicated below the block period number, e.g. MS1 below BP1 indicates that an uplink sending permission for block the period 1 is assigned to the MS1.

In FIG. 5A the PCU assigns an MS (denoted by MS1) having a silent period sending permission every third BP. Two other MSs (MS2 and MS3) are assigned sending permissions between the polling of the MS1. After noticing the MS1 has data to be transmitted, the PCU assigns the MS1 a sending permission on every BP. According to the normal polling procedure, the MS1 starts receiving additional sending permissions from $11^{th}$ block period as illustrated.

In FIGS. 5B and 5C the PCU assigns an MS (MS1) having a silent period sending permission every third BP. Two other MSs (MS2 and MS3) are assigned sending permissions between the polling of the MS1. Sending permissions assigned by the PCU are illustrated in FIG. 5B. When the BTS utilizing the invention notices the MS1 has more data to be transmitted, the BTS replaces sending permissions of other MSs with a sending permission of the MS1. Actual sending permissions which are sent to the MS1 after the BTS has modified the sending permissions are illustrated in FIG. 5C. As can be seen the MS1 receives additional sending permissions starting already from the $2^{nd}$ BP (BP2). When the BTS participates in the sending permission assignment operation being performed for the MS1, the MS1 receives enough sending permissions immediately when it has data to transmit after a silent period.

When the BTS replaces sending permissions assigned by the PCU or forms a new assignment bitmap for the MS, the BTS may optionally inform the PCU about it. The notification may be included e.g. into uplink PCU-TRAU frame control information. That way the PCU knows about the replacement or the change in the fixed allocation and does not expect an RLC/MAC block from some other MS.

Although the invention has been described above with a system dividing the transmission path on the air interface between several users by a time division multiple access (TDMA), it is obvious to one skilled in the art how to apply the invention in connection with other multiple access modulation techniques, such as code division multiple access (CDMA), frequency division multiple access (FDMA) or combinations of different techniques.

It will be obvious to a person skilled in the art that as the technology advances, the inventive concept can be implemented in various ways. Thus the invention and its embodiments are not limited to the examples described above, but they may vary within the scope of the claims.

The invention claimed is:

1. An arrangement comprising:
a control unit configured to schedule data transfer between a communication terminal and a communications system on at least one air interface;
the communication terminal configured to send on the air interface when a sending permission is assigned to the communication terminal; and
an access providing unit which is separate from the control unit and which is configured to provide an access to said communications system for said communication terminal and to assign a sending permission to the communication terminal,
wherein the control unit is further configured to assign a first sending permission to the communication terminal and to inform the access providing unit about this assignment, and
wherein the access providing unit is further configured to assign a second sending permission to the communication terminal in response to receiving an indication from the communication terminal indicating that the communication terminal has data to be sent.

2. The arrangement of claim 1, wherein the access providing unit is configured to perform said assignment in response to receiving an indication from the communication terminal, that the communication terminal has data to be sent.

3. The arrangement of claim 1, wherein:
the control unit is configured to assign a third sending permission to a first communication terminal and to inform the access providing unit about this assignment, and
the access providing unit is configured to assign the third sending permission to a second communication terminal in response to receiving an indication, from the second communication terminal, that the second communication terminal has data to be sent.

4. The arrangement of claim 1, wherein the access providing unit is configured to forward the indication to the control unit.

5. The arrangement of claim 1, wherein:
the indication in response to receipt of which the access providing unit is configured to assign the second sending permission to the communication terminal comprises a response sent by the communication terminal due to the first sending permission.

6. The arrangement of claim 5, wherein the access providing unit is configured to forward the response to the control unit.

7. The arrangement of claim 1, wherein the access providing unit is configured to assign sending permissions to the communication terminal until the communication terminal indicates that it has no more data to be sent.

8. The arrangement of claim 1, wherein the air interface is divided into time periods and sending permissions are configured to be assigned for one time period at a time.

9. The arrangement of claim 8, wherein the control unit is configured to indicate to the access providing unit time periods for which the access providing unit is not allowed to assign a sending permission to a communication terminal other than that already defined in the control unit.

10. The arrangement of claim 8, wherein the access providing unit is configured to keep a record of sending permissions for time periods that have been reserved in advance so as to avoid assigning sending permissions for such a reserved time period to a communication teiminal other than that having a reservation for the time period in question.

11. The arrangement of claim 8, wherein the access providing unit is a base station and the control unit is a packet control unit.

12. The arrangement of claim 11, wherein said time period is a block period.

13. The arrangement of claim 11, wherein a sending permission is assigned to the communication terminal by including an identifier of the communication terminal in a radio link control/medium access control block sent to the communication terminal.

14. The arrangement of claim 13, wherein said identifier is an uplink state flag allocated for the communication terminal.

15. The arrangement of claim 13, wherein the access providing unit is configured to assign the sending permission to the communication terminal by replacing the identifier of the communication terminal to an radio link control/medium access control block to be forwarded to the communication terminal.

16. An access providing unit comprising an apparatus, the apparatus configured to cause the access providing unit to at least:
cause access to a communications system to be provided for a communication terminal;
be located apart from a control unit configured to schedule data transfer between said communication terminal and the communications system on at least one air interface such that the communication terminal is allowed to send on the air interface when a sending permission is assigned to said communication terminal;
receive, from the control unit, information about an assignment of a first sending permission to the communication terminal; and
assign a second sending permission to the communication terminal in response to receiving an indication from the communication terminal indicating that the communication terminal has data to be sent.

17. The access providing unit of claim 16, wherein the apparatus is configured to cause the access providing unit to:
receive from the control unit information about an assignment of a third sending permission to a first communication terminal; and
assign the third sending permission to a second communication terminal in response to receiving an indication from the second communication terminal, that the second communication terminal has data to be sent.

18. The access providing unit of claim 16, wherein the apparatus is configured to cause the access providing unit to cause the indication to be forwarded to the control unit.

19. The access providing unit of claim 16, wherein the apparatus is configured to cause the access providing unit:
to receive from the control unit information about an assignment of a first sending permission to a first communication terminal; and
to assign a second sending permission to the first communication terminal in response to receiving a response due to the first sending permission from the communication terminal, which response indicates that the communication terminal has data to be sent.

20. The access providing unit of claim 19, the apparatus is configured to cause the access providing unit to cause the apparatus to cause the response to be forwarded to the control unit.

21. The access providing unit of claim 16, the apparatus is configured to cause the access providing unit to assign sending permissions to the communication terminal until the communication terminal indicates that it has no more data to be sent.

22. The access providing unit of claim 16, wherein the air interface is divided into time periods, and the apparatus is configured to cause the access providing unit to assign sending permissions for one time period at a time.

23. The access providing unit of claim 22, the apparatus being configured to cause the access providing unit to avoid assigning a sending permission to a communication terminal other than that already defined in the control unit for time periods indicated by the control unit.

24. The access providing unit of claim 22, the apparatus being configured to cause the access providing unit to keep a record of sending permissions for time periods that have been reserved in advance in order not to assign sending permissions for such a reserved time period to a communication terminal other than that having a reservation for the time period in question.

25. The access providing unit of claim 16, wherein the apparatus comprises or is embodied on a base station for a communications system supporting the general packet radio service.

26. The access providing unit of claim 25, the apparatus being configured to cause the access providing unit to assign a sending permission to a communication terminal by including an identifier of the communication terminal in a radio link control/medium access control block sent to the communication terminal.

27. The access providing unit of claim 26, the apparatus being configured to cause the access providing unit to assign a sending permission to the communication terminal by replacing the identifier of the communication terminal to a radio link control/medium access control block to be forwarded to the communication terminal.

28. A method comprising:
causing, by an access providing unit, access to a communications system to be provided for a communication terminal, wherein data transfer between said communication terminal and the communications system on at least one air interface is scheduled by a control unit, the control unit being separate from the access providing unit;
allowing the communication terminal to send on the air interface when a sending permission is assigned to the communication terminal;
receiving an indication from the control unit that the control unit has assigned a first sending permission to the communication terminal;
receiving an indication from the communication terminal indicating that the communication terminal has data to be sent; and
in response to receiving the indication from the communication terminal indicating that the communication terminal has data to be sent, assigning, by the access providing unit, a second sending permission to the communication terminal.

29. The method of claim 28, further comprising:
assigning at least one sending permission in the control unit, wherein the second sending permission assigned in the access providing unit is based at least in part on one of the sending permissions assigned in the control unit.

30. The method of claim 29, further comprising:
informing the access providing unit about said assigning of the sending permission in the control unit.

31. The method of claim 28, further comprising: causing the indication to be forwarded to the control unit.

32. The method of claim 28, wherein receiving the indication from the communication terminal comprises receiving in the access providing unit a response sent by the communication terminal due to the first sending permission, the response indicating that the communication terminal has data to be sent.

33. The method of claim 32, further comprising:
causing said response to be forwarded to the control unit.

34. The method of claim 28, further comprising:
assigning in the control unit a third sending permission to a first communication terminal;
receiving in the access providing unit an indication from a second communication terminal that it has data to be sent; and
assigning from the access providing unit the third sending permission to the second communication terminal.

35. The method of claim 28, further comprising:
assigning sending permissions in the access providing unit to the communication terminal until the communication terminal indicates that it has no more data to be sent.

36. The method of claim 28, further comprising:
dividing the air interface into time periods; and
allowing the communication terminal to send on the air interface during a time period for which the sending permission is assigned to the communication terminal.

37. The method of claim 36, further comprising:
assigning sending permissions for one time period at a time.

38. The method of claim 36, further comprising:
indicating from the control unit to the access providing unit time periods for which it is not allowed to assign a sending permission from the access providing unit to a communication terminal other than that already defined in the control unit.

39. The method of claim 36, further comprising:
keeping a record in the access providing unit of sending permissions for time periods that have been reserved in advance wherein sending permissions for such a reserved time period are not assigned in the access providing unit to a communication terminal other than that having a reservation for the time period in question.

40. The method of claim 36, wherein the communications system supports the general packet radio service, the access providing unit is a base station and the control unit is a packet control unit.

41. The method of claim 40, wherein said time period is a block period.

42. The method of claim 40, the method further comprising:
assigning the second sending permission to the communication terminal by including an identifier of the communication terminal in a radio link control/medium access control block sent to the communication terminal.

43. The method of claim 42, wherein said identifier is an uplink state flag allocated for the communication terminal.

44. The method of claim 42, further comprising:
assigning in the base station the second sending permission to the communication terminal by replacing in the access providing unit the identifier of the communication terminal to a radio link control/medium access control block to be forwarded to the communication terminal.

45. The method of claim 28, wherein said communications system is a telecommunications system.

46. The method of claim 28, wherein said communication terminal is a telecommunication terminal.

47. A terminal for use in a communications system wherein a control unit schedules data transfer between the terminal and the communications system, the control unit being configured to assign a first sending permission to the terminal, the terminal being configured to:
perform data transfer on an air interface shared with at least one other terminal; and
transmit a request for a sending permission to an access providing unit which is located apart from the control unit and is informed of the assignment of the first sending permission by the control unit, the request indicating that the terminal has additional data to be sent and being configured to, when received by the access providing unit, cause the access providing unit to assign a second sending permission to the terminal for a time period.

48. A terminal for use in a communications system wherein a control unit schedules data transfer between the terminal and the communications system, the control unit being configured to assign a first sending permission to the terminal, the terminal being configured to:
perform data transfer on an air interface shared with at least one other terminal when the first sending permission is assigned to the terminal by the control unit; and
transmit a request for a sending permission to an access providing unit which is located apart from the control unit and is informed of the assignment of the first sending permission by the control unit, the request indicating that the terminal has additional data to be sent and being configured to, when received by the access providing unit, cause the access providing unit to assign a second sending permission to the terminal.

* * * * *

UNITED STATES PATENT AND TRADEMARK OFFICE
CERTIFICATE OF CORRECTION

| | | |
|---|---|---|
| PATENT NO. | : 8,571,055 B2 | Page 1 of 1 |
| APPLICATION NO. | : 11/987193 | |
| DATED | : October 29, 2013 | |
| INVENTOR(S) | : Forssell | |

It is certified that error appears in the above-identified patent and that said Letters Patent is hereby corrected as shown below:

In the claims:

<u>Column 9,</u>
Line 13, "teiminal" should read --terminal--.

Signed and Sealed this
Eleventh Day of March, 2014

Michelle K. Lee
*Deputy Director of the United States Patent and Trademark Office*